(12) United States Patent
Depue

(10) Patent No.: US 6,212,204 B1
(45) Date of Patent: Apr. 3, 2001

(54) SUBSCRIBER LINE MULTIPLEXER

(76) Inventor: Clayton S. Depue, 1304 N. Meade St., Suite 11, Arlington, VA (US) 22209

( * ) Notice: Subject to any disclaimer, the term of this patent is extended or adjusted under 35 U.S.C. 154(b) by 564 days.

(21) Appl. No.: 08/562,197

(22) Filed: Nov. 22, 1995

(51) Int. Cl.[7] ................................................. H04J 3/02
(52) U.S. Cl. ........................................... 370/485; 370/535
(58) Field of Search ............................. 370/112, 71, 485, 370/493, 535, 536, 537, 542; 379/156, 160, 167, 90, 98

(56) References Cited

U.S. PATENT DOCUMENTS

| | | | |
|---|---|---|---|
| 4,449,218 | * 5/1984 | Strehl | 370/69.1 |
| 4,706,244 | 11/1987 | Watson et al. | 370/69.1 |
| 4,807,225 | 2/1989 | Fitch | 370/71 |
| 4,821,319 | 4/1989 | Middleton et al. | 379/167 |
| 4,996,709 | 2/1991 | Heep et al. | 379/160 |
| 4,999,613 | * 3/1991 | Williamson et al. | 340/573 |
| 5,090,052 | 2/1992 | Nakajima et al. | 379/98 |
| 5,140,630 | * 8/1992 | Fry et al. | 379/179 |
| 5,319,634 | * 6/1994 | Bartholomew et al. | 370/18 |
| 5,347,164 | * 9/1994 | Yeh | 307/66 |
| 5,363,432 | 11/1994 | Martin et al. | 379/90 |
| 5,473,613 | * 12/1995 | Bliven | 370/112 |
| 5,473,679 | * 12/1995 | La Porta et al. | 379/201 |
| 5,473,682 | * 12/1995 | Tanaka | 379/372 |
| 5,487,063 | * 1/1996 | Kakuma et al. | 370/56 |

OTHER PUBLICATIONS

"Digital Two–Line Carrier System" Pairgain Company Brochure, 1992.

Tratner, Mark "Is 2B1Q the key to universal ISDN?" *Telephony* Apr. 16, 1990.

Davis, Brendan "Broad Testers Pin–Point Open Circuits" *Test & Measurement Europe* Spring 1995.

* cited by examiner

Primary Examiner—Chi H. Pham
Assistant Examiner—Kwang B. Yao
(74) Attorney, Agent, or Firm—Lacasse & Associates; Randy W. Lacasse

(57) ABSTRACT

A system for the connection of any standard analog terminal subscriber telephone equipment, e.g. analog telephone, facsimile, and analog computer modem devices, to be utilized concurrently at a location interior to the building that is serviced by the single conventional two conductor telephone wire. The simple installation of the present invention's Master Subscriber Line Multiplexer Unit at the nearest interior or exterior location of the attachment of the telephone service provider's two conductor analog subscriber lines and the premise owned interior conventional two conductor analog telephone subscriber wire. The Master units input are two of the telephone service provider's two conductor analog subscriber lines. The control and voice and data signals are then multiplexed and transmitted over an interior conventional two conductor analog telephone subscriber wire to a remote location service by the wire. The present invention's Slave Subscriber Line Demultiplexer Unit provides demultiplexion, detection, and properly reproduces the control, data, and voice signals for each separate analog two conductor telephone subscriber lines.

13 Claims, 1 Drawing Sheet

SUBSCRIBER LINE MULTIPLEXER

BACKGROUND OF THE INVENTION

1. Field of Invention

This invention relates generally to a telephony multiplexed communications device for buildings with preexisting interior conventional two conductor wiring. More particularly, the invention relates to a multiplexor device that enables two, or more, line telephone service provided on two conductor analog subscriber telephony lines to be multiplexed over a single existing interior conventional two conductor wire and demultiplexed at the terminal subscriber location to two, or more, analog two conductor subscriber lines.

The problem with existing wired buildings with conventional two conductor telephony wiring is that there are often only single subscriber lines wired to specific locations in the buildings. Modern communications commonly require multiple analog terminal subscriber devices, e.g. analog telephone, facsimile, and analog computer modem devices, to be utilized concurrently at a single location interior to the building. Many older buildings were constructed at a time when a single telephone line comprised of a conventional two conductor wire was installed in only a few specific areas of the interior of the building. The modern communications user who needs two analog communications devices which can be used concurrently, is faced with the choice of installing another conventional two conductor analog telephone subscriber line through the existing interior building structure which can be both costly and possibly damaging to the interior building physical appearance. The modern communications user can also face stringent or prohibitive building codes or prohibitive historic codes if the building is categorized as a historic structure or limited alterations if enacted by community building associations regulations.

2. Discussion of Prior Art

In order to provide background information so that the invention may be completely understood and appreciated in its proper context, reference may be made to a number of prior art patents as follows:

U.S. Pat. No. 5,363,432, issued to Martin et al. is concerned with using shielded cable as opposed to, the single pair of conventional twisted unshielded two conductor wire, and broadband signals, e.g. television type signals. This patent proposes that if the telephone analog subscriber line uses a shielded cable consisting of more than one pair of wires, then one of these pair of wires and the shield element can be used to transmit a broadband type of signal into the subscriber's unit without having to add a separate coaxial type of cable commonly used in conventional broadband transmission systems.

U.S. Pat. No. 5,090,052, issued to Nakajima et. al. (Tandy Corp.) provides for a telephone system with multiple analog subscriber terminal equipment for use interior to the subscribers's building which allows multiple simultaneous calls on a single telephone line. A plurality of carrier frequencies are chosen to allow for simultaneous calls incorporating frequency modulating channels for each telephone extension. The present invention distinguishes itself therefrom by using the reducing technique of multiplexing so that two, or more, analog subscriber two conductor telephone lines supplied by the telephone service provider is transmitted over existing conventional two conductor telephone wire interior to the building and using an expanding technique of demultiplexing to provide the two, or more, separate analog two conductor subscriber lines to be connected to two unaltered standard analog subscriber terminal equipments.

U.S. Pat. No. 4,821,319, issued to Middleton et. al. and U.S. Pat. No. 4,996,709 to Heep et al. disclose devices solely concerned with intercommunications (intercom) service inside the subscriber's terminal unit, using one conventional analog two conductors subscriber line connected to the telephone service provider owned central office telephone switch. The present invention distinguishes itself by multiplexing two analog two conductor lines over one pair of conventional two conductor telephone wire preexisting and interior to the building.

U.S. Pat. No. 4,706,244, issued to Watson et al. discloses a frequency multiplexed system which couples a plurality of individual telephone sets to one analog two conductor telephone subscriber line, in which the system provides for intercommunications (intercom) calls between the telephone sets which have been designed specifically to decode the frequency multiplexed signal. This system also provides additional two conductor telephone subscriber lines and requires additional conventional two conductor telephone wiring interior to the building. The present invention distinguishes itself by multiplexing two, or more, analog two conductor lines provide by the telephone service company to the outside of the building over one pair of conventional two conductor telephone wire preexisting and interior to the building and allows subscriber's to install standard analog subscriber terminal equipment to the output two conductor terminal analog subscriber telephone lines.

U.S. Pat. No. 4,807,225, issued to Fitch discloses a frequency multiplexed system which couples a plurality of individual telephone stations to one analog two conductor telephone subscriber line, in which the system provides for telephone stations that create additional communications channels and a data channel at frequencies that do not interfere with standard analog telephone extension equipment already present. These telephone stations have been designed specifically to decode the frequency multiplexed signals. The present invention distinguishes itself by multiplexing two, or more, analog two conductor lines provided by the telephone service company to the outside of the building over one pair of conventional two conductor telephone wire preexisting and interior to the building and allows subscriber's to install standard analog subscriber terminal equipment to the output two conductor terminal analog subscriber telephone lines.

A commercially available digital two telephone line carrier system, manufactured by PairGain Technologies, Inc., provides equipment located at the central office telephone switch and typically at the subscriber terminal building telephone wire entrance to provide two analog two conductor subscriber lines over a single pair of two conductor analog telephone subscriber lines supplied by the telephone service provider exterior to the building. The present invention distinguishes itself by multiplexing two, or more, analog two conductor lines provided by the telephone service company to the outside of the building over one pair of conventional two conductor telephone wire preexisting and interior to the building and allows subscriber's to install standard analog subscriber terminal equipment to output two conductor terminal analog subscriber telephone lines. The present invention further distinguishes itself by not requiring any equipment at the telephone service provider central office switch location.

Whatever the precise merits, features, and advantages of the above cited references, none of them achieves or fulfills the purposes of the telephone subscriber line multiplexer system of the present invention.

SUMMARY OF THE INVENTION

Accordingly, it is a principal object of the present invention to achieve the fully functional two conductor analog telephone subscriber lines multiplexing over a single conventional two conductor telephone wire that preexists in the interior of the building's structure and demultiplexing the signal into the original fully functional two, or more, analog two conductor telephone subscriber lines.

It is a further object of the present invention to allow for the connection of any standard analog terminal subscriber telephone equipment, e.g. analog telephone, facsimile, and analog computer modem devices, to be utilized concurrently at a location interior to the building that is serviced by the single conventional two conductor telephone wire that preexists in the interior of the building's structure.

The Multiple Line Telephone Multiplexed Communications System of the present invention overcomes the problems and limitations of adding additional analog two conductor telephone subscriber lines to the interior of buildings with existing interior single conventional two conductor analog telephone wire that by virtue of the building, historic, or community regulations prohibit additional interior telephone wiring or the economics become prohibitively costly for the installation and restored to original physical condition. The simple installation of the present invention's Master Subscriber Line Multiplexer Unit at the nearest interior, or exterior, location of the attachment of the telephone service provider's two conductor analog subscriber lines and the premise owned interior conventional two conductor analog telephone subscriber wire. The Master units inputs are two, or more, of the telephone service provider's two conductor analog subscriber lines. The control and voice and data signals are then multiplexed and transmitted over an interior conventional two conductor analog telephone subscriber wire to a remote location service by the wire. The present invention's Slave Subscriber Line Demultiplexer Unit provides demultiplexion, detection, and properly reproduces the control, data, and voice signals for each separate analog two conductor telephone subscriber lines. The present invention allows for the connection of any standard analog terminal subscriber telephone equipment, e.g. analog telephone, facsimile, and analog computer modem devices, to be utilized concurrently at a location interior to the building that is serviced by the single conventional two conductor telephone wire.

The Master Subscriber Line Multiplexer Unit contains electronic circuitry that interacts with the telephone service provider's central office telephone switch for dialing, ring detection, and communications for the two, or more, telephone service providers analog two wire telephone subscriber lines. The Master Unit then multiplexes the incoming telephone line calls and sends control signals for the lines on to the existing interior conventional two conductor telephone wire-pair. The Master Unit also demultiplexes the outgoing terminal subscriber line calls and signals the appropriate line to the central office switch and communicates the voice or data and terminates the call when transmission is signaled complete by the terminal subscriber equipment.

Slave Subscriber Line Demultiplexer Unit (Slave Unit) contains electronic circuitry that interacts with the Master Subscriber Line Multiplexer Unit to demultiplex the incoming calls and generate the appropriate line ringing signal, supervisory signals from the central office switch, on hook and off hook detection, and data and voice communications for the two telephone service providers analog two wire subscriber lines. The Slave Subscriber Line Unit for outgoing subscriber terminal calls will detect and encode for each subscriber terminal line both rotary pulse dial codes and Dual Tone Multifrequency (DTMF) dial tones, detect on and off hook status and transmit those signals to the Master Unit over the existing interior conventional two conductor telephone wire-pair. The Slave Unit will multiplex the two telephone terminals equipment's voice and data requirements concurrently and terminate the transmission with appropriate control signals when the terminal equipment indicates completion of the assigned communications task.

DESCRIPTION OF THE PREFERRED EMBODIMENTS

Figure 1:
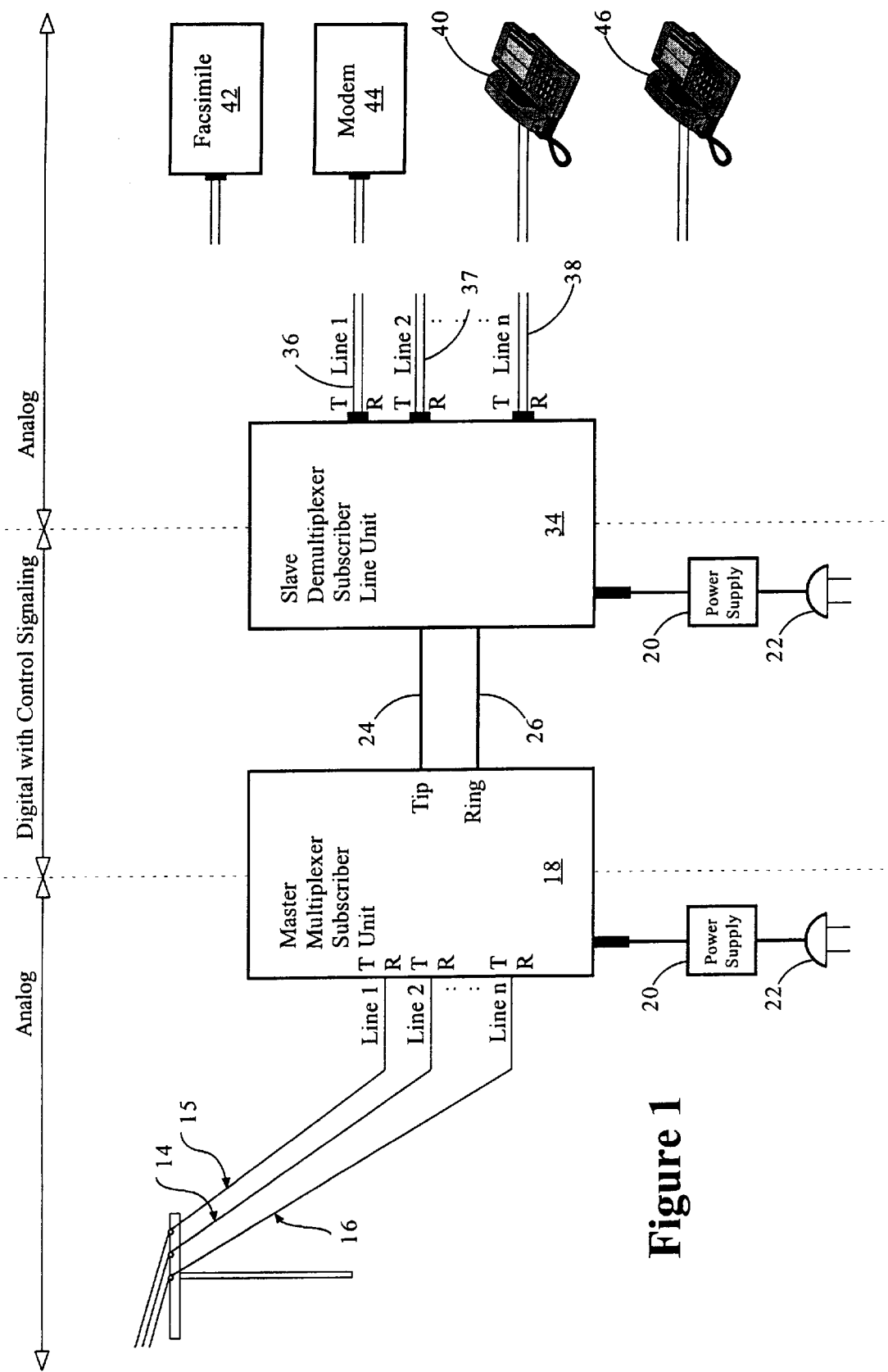
FIG. 1 illustrates a symbolic pictorial drawing showing two through n telephone subscriber line multiplexed telephony system of the present invention.

FIG. 1 provides the overall Telephony Multiplexed Communications System and is composed of a Master Multiplexer Subscriber Line Unit (Master), 18, and Slave Subscriber Line Units (Slave), 34, that are interconnected to each other by a single conventional two conductor telephone wire, 24 and 26, interior to the building. The two through n analog telephone subscriber lines supplied by the telephone service provider, 14–16, are connected to the Master Unit at the telephone service entrance to the building in close proximity to existing country alternating current line power and also houses one terminal end of the interior preexisting conventional two conductor telephone wire, 24 and 26. The Master is then connected to a single interior two conductor pair wire 24 and 26 that is preexisting and is run to a single terminal location within the building. The Slave Unit is then connected to the terminal location of the preexisting conventional two conductor telephone wire 24 and 26 at a point in close proximity to existing alternating current line power outlet. The Slave Unit can accommodate any standard two wire analog terminal subscriber equipment on the female RJ11 two, or more, wire analog telephone subscriber ports 36, 37 and 38.

Master Subscriber Line Unit

The Master Unit 18 functions as an interface between the outside provided two, or more, analog telephone subscriber lines supplied by the telephone service provider, 14, 15 and 16, which originates at the dial central office telephone switching equipment and the digital multiplexing and signal control scheme provided to connect to the preexisting conventional two conductor telephone wire, 24 and 26. The Master Unit 18 is powered by a direct current that has been transformed by a switch selectable alternating current to direct current power supply designated 20, 22. The power supply 20 has a switch selectable input alternating current source range to support various countries' alternating current power sources as necessary, e.g. nominal 115 volts at 60 hertz frequency for the U.S., nominal 220 volts at 50 hertz frequency for Europe. It is envisioned that the power may be alternately supplied from the existing telephone lines. The Master Unit 18 provides dialing, ring detection, and data and voice communications for the two, or more, telephone service providers analog two wire subscriber lines, 14, 15 and 16, which are connected via analog signal and communications telephony techniques to the telephone service provider's dial central office telephone switch. The Master Unit then uses digital and analog techniques to provide the control signals such as ring, busy line, and progress tones and voice and data signals and place those on the Tip conductor 24 and Ring conductor 26. The Tip conductor 24 and Ring conductor 26 provide the conduit for the two way digital multiplexion of both incoming and outgoing telephone calls for the two, or more, analog telephone subscriber lines supplied by the telephone service provider 14, 15 and 16. The details and methods for handling incoming and outgoing telephone calls are discussed in a separate section below.

The Master Unit 18 provides for the detection of power failures and an Automatic reset mechanism for any power failures. The Master Unit 18 also provides both optocoupled protection and UL 1459 protection for U.S. or the foreign equivalent certified protection at the frontend connection to the two analog telephone subscriber lines supplied by the telephone service provider 14, 15 and 16.

Slave Demultiplexer Subscriber Line Unit

The Slave Unit 34 functions as an interface between the Master Unit 18 and the analog terminal subscriber equipment, e.g. analog telephone 40, facsimile 42, analog computer data modem 44, facsimile or analog telephone detection switch 46, which are connected to the Slave Unit's 34 two conductor telephone line ports 36, 37 and 38. These two, or more, telephone lines, 36, 37 and 38, are composed of a TIP and Ring conductor configured in the standard female RJ11 connector thereby mating the connection of standard analog terminal subscriber equipment, 40, 42, 44, 46, having a male RJ11 telephone connector. The Slave Unit 34 is powered by a direct current that has been transformed by a switch selectable alternating current to direct current power supply designated 20. The power supply 20 has a switch selectable input alternating current source range to support various countries' alternating current power sources as necessary, e.g. nominal 115 volts at 60 hertz frequency for the U.S., nominal 220 volts at 50 hertz frequency for Europe.

The Slave Unit 34 interacts with the Master Unit 18 to demultiplex the incoming calls and generate the appropriate line ringing signal, supervisory signals from the central office switch, on hook and off hook detection, and data and voice communications for the analog two wire subscriber lines 36, 37 and 38. The Slave Unit 34 detects and processes outgoing subscriber terminal calls. The Slave Unit 34 will detect and encode for each subscriber terminal line both rotary pulse dial codes and Dual Tone Multifrequency (DTMF) dial tones, detect on and off hook status and transmit those signals to the Master Unit 18 over the single existing interior conventional two conductor telephone wirepair 24 and 26. The Slave Unit 34 will multiplex the two, or more, telephone terminals equipments voice and data requirements concurrently and terminate the transmission with appropriate control signals when the terminal equipment 40, 42, 44, 46, indicates completion of the assigned communications task. The Slave Unit 34 provides the detection of power failures and an Automatic reset mechanism for any power failures.

Incoming Calls Functional Description

This paragraph provides a functional description of the process of the present invention as it handles the two, or more, analog two conductor telephone subscriber lines 14, 15, and 16 for incoming telephone calls. The incoming telephone call first generates a ring signal at the telephone service providers dial central office telephone switch on one of the two through n analog two wire telephone subscriber lines 14, 15 or 16. The Master Unit 18 detects the ring signal from the dial central office and then signals the Slave Unit 34 to detect if the terminal subscriber equipment 40, 42, 44, 46, attached to the two conductor analog subscriber line of the Slave Unit 36, 37 or 38 is on hook or off hook. If the designated telephone line terminal subscriber equipment 40, 42, 44, 46, is off hook and therefore busy the Slave Unit 34 then signals the Master Unit 18 not to seize the line 14, 15 or 16 thereby signaling the dial central office that the terminal subscriber equipment 40, 42, 44, 46, is busy. If the Slave Unit 34 detects that the terminal subscriber equipment 40, 42, 44, 46, is on hook and thereby not busy then the Slave Unit 34 signals the Master Unit 18 to seize the telephone line. Upon the Master Unit 18 seizing the line to establish communication with the dial central office telephone switch the Slave Unit 34 will generate a ring signal to the appropriate terminal subscriber equipment 40, 42, 44, 46. At any time, if the terminal subscriber equipment 40, 42, 44, 46, goes on hook, the Slave Unit 34 will signal the Master Unit 18 which will release the line signaling to the dial central office switch that the terminal end has disconnected the telephone call. Conversely if the dial central office signals that the originating end has gone on hook and terminated the telephone call then the Master Unit 18 will release the line and signal the Slave Unit 34 that the originating end has disconnected the telephone call. Once the Master Unit 18 has seized the line acknowledging that the terminal subscriber equipment 40, 42, 44, 46, is off hook the two way data or voice communications can ensue. The Master Unit 18 will multiplex the originating callers data or voice over the preexisting conventional two conductor telephone wire, 24 and 26 to the Slave Unit 34 which will demultiplex the data and voice and generate the analog signal to the appropriate analog two wire subscriber lines 36, 37 and 38. The incoming telephone call will be terminated by either the originator or terminal subscriber going on hook as functionally described above.

Outgoing Calls Functional Description

This paragraph provides a functional description of the process of the present invention as it handles the terminal subscriber equipment 40, 42, 44, 46, for outgoing telephone calls. The terminal subscriber equipment 40, 42, 44, 46, will initiate the outgoing telephone call procedure. The Slave Unit 34 detects the terminal subscriber telephone equipment 40, 42, 44, 46, going from the on hook condition to the off hook condition signifying that the analog terminal subscriber telephone equipment 40, 42, 44, 46, is ready to communicate. The Slave Unit 34 will signal the Master Unit 18 that the outgoing call is necessary on the appropriate two conductor analog terminal subscriber line port 36, 37 or 38 on the Slave Unit 34. The Master Unit 18 will then seize the telephone line. Upon the Master Unit 18 seizing the line to establish communication with the dial central office telephone switch the Master Unit 18 will signal the Slave Unit 34 that the line has been seized and dialing procedures may begin. The Slave Unit 34 will detect and encode for each subscriber terminal line both rotary pulse dial codes and Dual Tone Multifrequency (DTMF) dial tones and multiplex the control signals to the Master Unit 18 which will detect the dial control signals and generate them on the appropriate two analog telephone subscriber lines 14, 15 and 16 supplied by the telephone service provider. Once dialing control signals have completed the Master Unit 18 will wait for any progress control signals to be generated by the dial office central telephone switch or the distant end terminal subscriber equipment going off hook and thereby ready to communicate. Once the distant end is off hook signifying a complete connection on the telephone system the Master Unit 18 will signal the Slave Unit 34 that data or voice communication can begin. The Slave Unit 34 will multiplex the voice or data from the terminal subscriber telephone equipment 40, 42, 44, 46, and transmit the multiplexed signal over the single existing interior conventional two conductor telephone wire-pair 24 and 26. The Master Unit will demultiplex the signal and generate and transmit the voice or data signal over the appropriate one of the two through n analog telephone subscriber lines supplied by the telephone service provider 14, 15 or 16 to the dial central office. The Master Unit 18 will conversely detect the incoming data voice or control signals for the communications session and Multiplex that analog signal for transmission to the Slave Unit 34 over the existing interior conventional two conductor telephone wire-pair 24 and 26. The Slave Unit 34 will then demultiplex the data or voice signal from the Master Unit 18 and generate the analog signals on the appropriate two conductor terminal subscriber lines 36, 37 or 38 At any time if the terminal subscriber equipment 40, 42, 44, 46, goes on hook the Slave Unit 34 will signal the Master Unit 18 which will release the line signaling to the dial central office switch that the terminal end has disconnect the telephone call. If at any time the central office telephone switch signals to the Master Unit 18 that the distant end terminal subscriber equipment has gone on hook and thereby terminated the telephone call prematurely the Master Unit 18 will detect the signal and transmit a signal to the Slave Unit 34 that call has been terminated. The Slave Unit 34 will generate a dial tone to the terminal subscriber equipment designating a terminated call and line available for outgoing or incoming call. At the same time the Master Unit 18 will drop the line signaling to the central office switch the line is free for incoming or outgoing calls.

CONCLUSION

A system and method has been shown in the above embodiments for the effective implementation of a Subscriber Line Multiplexer. While various preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A system for increasing the capacity of preexisting subscriber lines located within a subscriber's premises comprising:
    at least two external analog telephone subscriber lines supplied by a telephone service provider including data, voice, and control signals;
    a master multiplexer subscriber line unit located external to said subscriber's premises comprising:
        at least two frontend electronic connections to said at least two external analog telephone subscriber lines supplied by the telephone service provider;
        multiplexing and demultiplexing circuitry for data voice communications for said at least two external analog telephone subscriber lines;
        detection and generation circuitry for analog telephone signaling and control;
    an interior preexisting conventional two conductor telephone wire;
    a slave demultiplexer subscriber line unit located within said subscriber's premises comprising:
        at least two output electronic connections for the generation of signals for two internal analog telephone subscriber lines for connection to analog terminal subscriber equipment;
        multiplexing and demultiplexing circuitry for data voice communications for said at least two internal analog telephone subscriber lines;
        AC power supply provided by said subscriber;
        detection and generation circuitry for analog telephone signaling and control, and
    wherein said at least two external analog telephone subscriber lines supplied by a telephone service provider are functionally connected to said analog terminal subscriber equipment through said master multiplexer, multiplexed across said interior preexisting conventional two conductor telephone wire, received by said slave multiplexer and connected to said at least two internal analog telephone subscriber lines thereby increasing the internal preexisting line capacity without physically adding additional lines internally.

2. A system for increasing the capacity of preexisting subscriber lines located within a subscriber's premises according to claim 1, further comprising electronic circuitry for the detection of multiplexed rotary pulse dial codes and Dual Tone Multifrequency (DTMF) dial tones for each subscriber terminal line being transmitted over interior preexisting conventional two conductor telephone wire.

3. A system for increasing the capacity of preexisting subscriber lines located within a subscriber's premises according to claim 2, wherein electronic circuitry for generation of both rotary pulse dial codes and Dual Tone Multifrequency (DTMF) dial tones for each of the at least two analog telephone subscriber lines is supplied by the telephone service provider to the central office telephone switch for outgoing telephone calls.

4. A system for increasing the capacity of preexisting subscriber lines located within a subscriber's premises according to claim 1, further comprises electronic circuitry to detect call progress signals from the dial central telephone office switch for all of the at least two analog telephone subscriber lines supplied by the telephone service provider.

5. A system for increasing the capacity of preexisting subscriber lines located within a subscriber's premises according to claim 4, further comprising electronic circuitry for the multiplexing of the call progress tones over interior preexisting conventional two conductor telephone wire.

6. A system for increasing the capacity of preexisting subscriber lines located within a subscriber's premises according to claim 1, further comprising electronic circuitry to detect multiplexed terminal subscriber telephone equipments' on-hook and off-hook control signals.

7. A system for increasing the capacity of preexisting subscriber lines located within a subscriber's premises according to claim 6, further comprising electronic circuitry for the seizing and release of any of the two, or more, analog telephone subscriber lines supplied by the telephone service provider.

8. A system for increasing the capacity of preexisting subscriber lines located within a subscriber's premises according to claim 1, further comprising electronic circuitry for the detection of power failure and automatic power failure reset.

9. A system for increasing the capacity of preexisting subscriber lines located within a subscriber's premises according to claim 1, further comprising electronic circuitry for the multiplexing and demultiplexing of the voice and data for outgoing and incoming calls for both of the analog two conductor telephone subscriber lines transmitted over interior preexisting conventional two conductor telephone wire once the telephone call has been established between originating and distant terminal subscriber equipments.

10. A system for increasing the capacity of preexisting subscriber lines located within a subscriber's premises according to claim 1, wherein said at least two analog two conductor subscriber telephone lines generate and detect all the analog control, data and voice signals necessary for the connection of any standard analog terminal subscriber telephone equipment for communication purposes.

11. A system for increasing the capacity of preexisting subscriber lines located within a subscriber's premises according to claim 1, wherein both rotary pulse dial codes and Dual Tone Multifrequency (DTMF) dial tones for each subscriber terminal line are multiplexed over said interior preexisting conventional two conductor telephone wire.

12. A system for increasing the capacity of preexisting subscriber lines located within a subscriber's premises according to claim 1, further comprises demultiplexing of the call progress tones over interior preexisting conventional two conductor telephone wire.

13. A system for increasing the capacity of preexisting subscriber lines located within a subscriber's premises according to claim 1, further comprising a switch selectable input alternating current source range to support various countries' alternating current power sources as necessary with an output voltage of direct current for input to both the Master Multiplexer Subscriber Line Unit and the Slave Demultiplexer Subscriber Line Unit.

* * * * *

UNITED STATES PATENT AND TRADEMARK OFFICE
CERTIFICATE OF CORRECTION

PATENT NO. : 6,212,204 B1
DATED : April 3, 2001
INVENTOR(S) : Clayton S. Depue

It is certified that error appears in the above-identified patent and that said Letters Patent is hereby corrected as shown below:

Column 1,
Line 8, delete "multiplexor" insert therefore -- multiplexer --.

Column 2,
Line 21, delete "provide" insert therefore -- provided --.

Column 4,
Lines 29 and 36, after "wire" insert therefore -- , --.
Lines 29 and 32, after "26" insert therefore -- , --.

Column 5,
Line 21, after "34" insert therefore -- , --.
Line 46, after "wire-pair" insert therefore -- , --.

Column 6,
Line 2, after "and" insert therefore -- , --.
Line 2, after "therefore" insert therefore -- , --.
Line 17, after "Conversely" insert therefore -- , --.
Line 27, after "26" insert therefore -- , --.
Line 50, after "switch" insert therefore -- , --.
Line 51, after "34" insert therefore -- , --.
Line 63, after "hook" insert therefore -- , --.
Line 64, after "system" insert therefore -- , --.

UNITED STATES PATENT AND TRADEMARK OFFICE
CERTIFICATE OF CORRECTION

PATENT NO.    : 6,212,204 B1
DATED         : April 3, 2001
INVENTOR(S)   : Clayton S. Depue It is certified that error appears in the above-identified patent and that said Letters Patent is hereby corrected as shown below:

Column 7,
Line 3, after "wire-pair" insert therefore -- , --.
Line 8, after "will" insert therefore -- , --.
Line 8, after "conversely" insert therefore -- , --.
Line 12, after "wire-pair" insert therefore -- , --.
Line 15, after "time" insert therefore -- , --.
Line 18, delete "disconnect" insert therefore -- disconnected --.
Line 24, after "that" insert therefore -- the --.
Line 27, delete "call" insert therefore -- calls --.
Line 28, after "switch" insert therefore -- such that --.

Signed and Sealed this

Twenty-ninth Day of January, 2002

Attest:

Attesting Officer

JAMES E. ROGAN
Director of the United States Patent and Trademark Office